May 19, 1953  D. GLAZER  2,638,632
METHOD OF MOLDING
Filed June 17, 1950
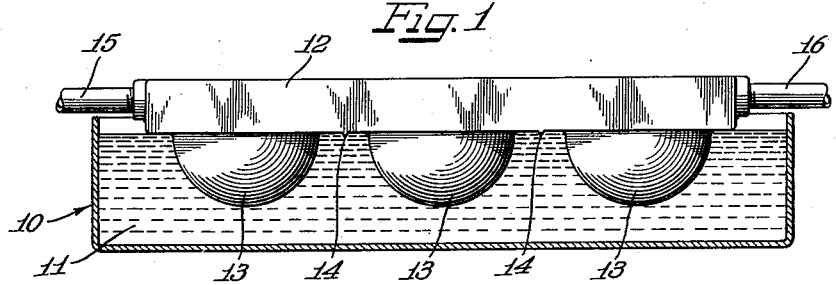
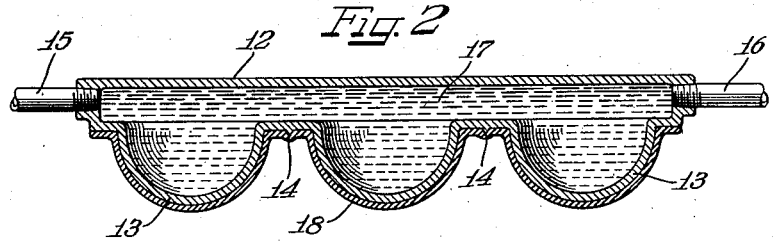
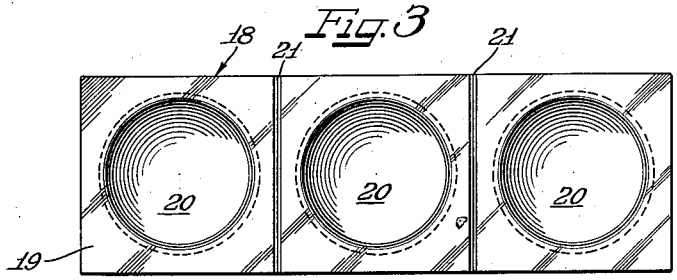
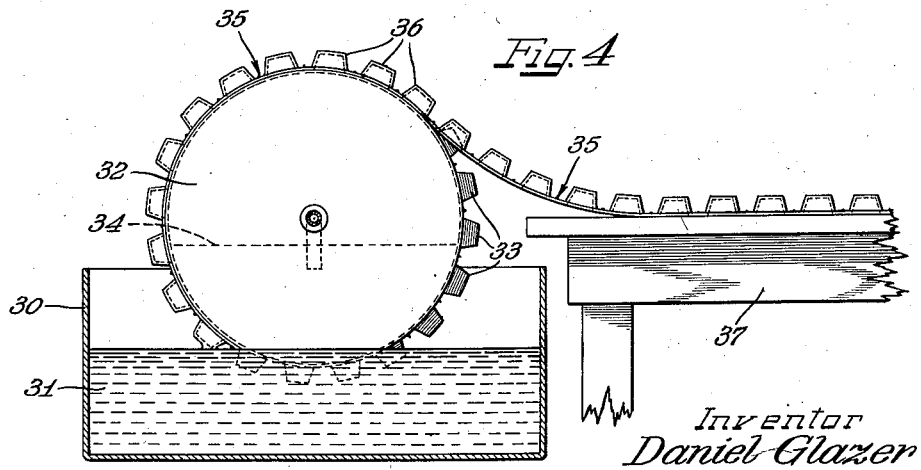
Inventor
Daniel Glazer
by _____ Attys Patented May 19, 1953

2,638,632

UNITED STATES PATENT OFFICE 2,638,632

METHOD OF MOLDING

Daniel Glazer, Chicago, Ill.

Application June 17, 1950, Serial No. 168,807

4 Claims. (Cl. 18—58.4)

1

The present invention relates to a method of molding.

The invention is directed particularly to the molding of wax containers for frozen confections, such as ice cream, sherbet, and the like, but has general application to the molding of compositions that congeal at room temperatures.

In molding wax compositions in the process where a mold form is immersed in a bath of liquid wax, it has been common practice to use a lubricant for the mold to facilitate removal of the congealed wax from the mold form. It has also been common practice to use a polished surface on the mold form to facilitate removal of the congealed wax without destroying the pattern of the molded wax. Even when these precautions are taken, it has been found that the molded wax is very often incapable of being stripped intact from the mold and resort has been had to the use of mechanical strippers to strip the congealed wax from the mold form. In making very thin molded articles, the use of such mechanical strippers is very likely to cause cracks in the wax article, with consequent rejects.

An object of the present invention is to provide a process for molding wax compositions which is capable of producing thin wax patterns without the use of lubricants, polished surfaces on the mold form, and without the use of mechanical strippers for removing the wax pattern from the mold form.

Still another object of the present invention is to provide a method for molding thin-walled wax receptacles.

Another object of the present invention is to provide a method for continuously molding wax receptacles, characterized by the ease with which the molded receptacle is removed from the mold form.

I have found that thin-walled wax articles can be quickly and conveniently molded in a process in which a mold form is immersed in a bath of the wax by adjusting the temperature differential between the cooler mold form and the bath of molten wax. The critical temperature differential between the mold form and the molten wax will, of course, vary with the composition of the wax employed, but, in general, I have found that by maintaining a temperature differential of at least 60° F., the wax quickly congeals upon the mold form and is easily removed therefrom simply by lifting the wax pattern from the mold form without the necessity of using a mechanical stripper for peeling the wax pattern from the mold form.

2

Since the wax pattern is so easily removable from the mold form, the process of the present invention very readily lends itself to continuous operation, and this forms an important feature of the invention.

The type of waxes to be used in the practice of the present invention may be varied considerably. Ordinary paraffin wax can be used, or mixtures of natural and synthetic waxes. For example, a preferred composition within the practice of the present invention is the wax composition known as "cheese wax" which is a blend of refined paraffin wax containing from 75% to 85% by weight paraffin, and the balance constituting microcrystalline wax in an amount from 15% to 25% by weight. If desired, the wax composition may be compounded with mineral oil, rubber, resins and similar substances. However, the use of lubricating agents either in the wax composition or on the surfaces of the mold form is rendered unnecessary if the proper temperature differentials are maintained.

A further description of the present invention will be made in connection with the attached sheet of drawings, in which:

Figure 1 is an elevational view of a mold form partially immersed within a bath of a molten wax composition, with parts in section.

Figure 2 is a cross-sectional view of the mold form after removal from the wax bath illustrating a thin layer of wax congealed thereon;

Figure 3 is a plan view of a molded wax strip illustrating the receptacles produced according to the process of the present invention; and Figure 4 is a view in elevation and partly in section, of a rotatable mold form assembly for operating the process of the invention in a continuous manner.

As shown on the drawing:

Reference numeral 10 denotes generally a vessel having a molten bath 11 of a wax or wax-like composition therein. The bath 11 is preferably maintained at a temperature just slightly above its melting point. Ordinarily, this temperature will not exceed about 140° F.

The mold form illustrated in Figure 1 consists of a generally rectangular hollow casing 12 having semi-spherical protuberances 13 extending therefrom, defining molding surfaces. Between the individual protuberances 13, the casing 12 is provided with a series of knife-edged ridges 14 for the purpose of defining lines of weakness in the wax which congeals along these surfaces.

The hollow casing 12 is also provided with an inlet 15 threaded into the casing 12 for the purpose of introducing a coolant such as brine into the hollow interior of the casing 12 and the protuberances 13.

At the opposite end of the casing 12, an outlet pipe 16 is threaded into the wall of the casing 12 to provide for circulation of the coolant medium 17 through the assembly, and thus maintain a good degree of temperature control.

The mold casing 12, as well as the protuberances 13, need not be provided with polished or smooth surfaces, so long as the material from which the casing 12 is made is sufficiently heat-conductive. For example, I have found that an ordinary cast iron mold form presents no problem with respect to removing the wax pattern from the mold form if the proper temperature differentials are maintained between the mold form and the wax bath. The mold may thus be made of any metal or alloy having a coefficient of thermal conductivity similar to or greater than that of cast iron.

When the mold form is immersed into the bath 11, with the protuberances 13 submerged, a thin layer of wax will immediately start to build up along the protuberances 13 and along the undersurface casing 12. The depth of the wax deposit will depend essentially upon the temperature differential maintained between the interior of the mold form and the molten wax 11, and also upon the time that the mold form is immersed within the liquid wax body. In Figure 2, the wax deposit has been illustrated at 18.

The wax form 18, which separates by its own weight when removed from the bath 11, has the appearance illustrated in Figure 3. As there illustrated, the wax form consists of a thin flat border 19 and central semi-circular recesses 20 defining receptacles. The individual receptacles are separated by lines of weakness illustrated at 21 caused by the ridges 14 in the casing 12. These receptacles may be easily separated by breaking along the line of weakness 21 to form the individual receptacles.

In Figure 4, there is illustrated an apparatus for carrying out the process of the present invention in a continuous manner. A vessel 30 is partially filled with a molten wax composition 31. A drum 32 having a plurality of radial protrusions 33 in the form of frusto-pyramids is mounted for rotation above the level of the molten bath 31 so that a plurality of the protuberances 33 are immersed within the bath 31 at all times during the rotation of the drum 32.

Within the drum 32 is a supply of coolant liquid such as brine, the liquid level of which is indicated by the dotted line 34. As previously described, the bath 31 is maintained at a temperature slightly above the melting point of the wax, while the temperature of the drum is kept at a lower temperature, affording a differential of at least about 60° F. between the drum 32 and the bath 31.

As the drum 32 is slowly rotated, the wax of the bath 31 in contact with the protuberances 33 congeals on the surface of the drum 32 to a thickness determined by the temperature differential and the speed of rotation of the drum 32. After continued rotation of the drum 32, a continuous strip 35 is formed having concave receptacle portions 36 spaced therealong. If the temperature differential is properly adjusted for the particular wax composition used, the track 35 disengages itself from the drum 32 solely by the rotation of the drum. This condition is illustrated in Figure 4, in which the strip 35 is shown as it is being fed onto the surface of a cutting table 37.

The receptacles of the present invention are particularly useful in storing frozen confections, and the process involved can be economically and conveniently installed at the place of manufacture of the frozen confections. This eliminates excessive freight costs and inventories of paper and other receptacles which have heretofore been used. The receptacles are particularly well suited for storing and serving individual portions of frozen confections, as the receptacles can be made in any of a large variety of shapes and sizes. Since only inexpensive wax material is used, the containers can be considered disposable.

The molded containers of the present invention are quite firm at ordinary storage temperatures, although they become somewhat plastic at serving temperatures. This feature is desirable as the container can be stripped from the frozen confections very readily by merely heating the container by dipping the same into cold water.

If desired, the receptacle may be coated with an edible shellac or similar substance to impart a glazed finish thereto.

The control of the temperature differentials in the formation process is quite important in order to secure the proper setting characteristics of the wax. For example, in one run, the mold form was maintained at a temperature of 55°, while the temperature of a paraffin wax bath was maintained at 125° F., leaving a differential of 70° F. Under these conditions the wax pattern formed readily, retained its shape, and was easily removed from the form. However, when the temperature of the form was raised to 82° F. while maintaining the temperature of the paraffin at 125° F., the wax could be removed from the form only by stripping, causing the wax pattern to lose its shape.

In another run, "cheese wax" was used as the starting material. The temperature of the form was maintained at approximately 32° F., while the bath of "cheese wax" was maintained at 135° F. Under these conditions, a firm pattern was obtained which retained its shape and was easily removed from the form. As the temperature of the form was raised so that the differential temperature was less than 60°, a coating was formed, but it could not be stripped satisfactorily from the mold.

From the foregoing, it will be appreciated that the present invention provides a convenient, inexpensive method for manufacturing molded wax receptacles of a predetermined size and shape. Through a proper adjustment of the molding conditions, the wax pattern formed on the mold form can be readily removed therefrom without the necessity of using a lubricant, or mechanical stripping means, and without providing a polished or smooth surface on the mold form. The process of the present invention is readily adaptable to continuous operation, thus decreasing the cost of the molded articles.

It will be understood that modifications and variations may be effected without departing from the scope of the novel concepts of the present invention.

I claim as my invention:

1. The method of molding a wax-like composition into a relatively thin-walled strip having repetitively aligned cup-like receptacles, which comprises providing a molten bath of a wax composition maintained at a temperature only slightly above its melting point, immersing in said bath a metal mold form having protuberances complementarily contoured to form the aforesaid strip and aligned cup-like receptacles, cooling said mold form while so immersed to maintain a temperature differential of at least 60° F. between said mold form and said molten bath during immersion therein to cause said wax composition to congeal in a thin layer on the immersed surfaces of said mold form in contact therewith without strongly adhering thereto, and removing said thin layer of congealed wax composition from said mold form as an intact molded strip having repetitively aligned cup-like receptacles.

2. The method of molding a wax-like composition into a relatively thin-walled strip having repetitively aligned cup-like receptacles, which comprises providing a molten bath of a wax composition containing from 75% to 85% of paraffin and from 25% to 15% of microcrystalline wax by weight maintained at a temperature only slightly above its melting point, immersing in said bath a metal mold form having protuberances complementarily contoured to form the aforesaid strip and aligned cup-like receptacles, cooling said mold form while so immersed to maintain a temperature differential of at least 60° F. between said mold form and said molten bath during immersion therein to cause said wax composition to congeal as a thin layer directly on the immersed surfaces of said mold form without strongly adhering thereto, and removing said thin layer of congealed wax composition from said mold form as an intact molded strip having repetitively aligned cup-like receptacles.

3. A continuous method for molding a wax composition into a continuous thin-walled strip having repetitively aligned receptacle-forming depressions, which comprises providing a molten bath of a wax composition maintained at only slightly above its melting point, rotating an annular metal mold form through said bath to successively immerse portions of said mold form therein and to emerge such portions therefrom, cooling the portions of said mold form so immersed to maintain a temperature differential of at least 60° F. between said portions and said bath during immersion therein to cause said wax composition to congeal on the immersed surfaces of said mold form without strongly adhering thereto, and continuously removing said congealed wax composition from said mold form as a continuous molded strip having repetitively aligned receptacle-forming depressions.

4. A continuous method for molding a wax-like composition into a thin-walled strip having repetitively aligned receptacle-forming depressions, which comprises providing a molten bath of a wax composition maintained at a temperature slightly above its melting point, continuously moving a metal mold form having successive protuberances complementarily contoured to form the aforesaid strip and aligned depressions to successively position the protuberances into and out of said bath, cooling the portions of said mold form immersed in said bath to maintain a temperature differential of at least 60° F. between said portions and said bath during immersion therein to cause the wax composition to congeal directly on the immersed surfaces of said mold form without strongly adhering thereto, and continuously removing the congealed wax composition from said mold form as the protuberances emerge from the bath to provide a continuous molded strip having repetitively aligned receptacle-forming depressions.

DANIEL GLAZER.

References Cited in the file of this patent

UNITED STATES PATENTS

| Number | Name | Date |
|---|---|---|
| 1,087,974 | Owen | Feb. 24, 1914 |
| 1,423,122 | Kyriazopoulos | July 18, 1922 |
| 2,035,117 | English | Mar. 24, 1936 |
| 2,118,438 | Lawrence | May 24, 1938 |
| 2,273,926 | Brannon | Dec. 20, 1938 |
| 2,251,785 | Dons | Aug. 5, 1941 |
| 2,287,087 | Clausen | June 23, 1942 |
| 2,476,710 | Eaton | July 19, 1949 |